Figure 1:
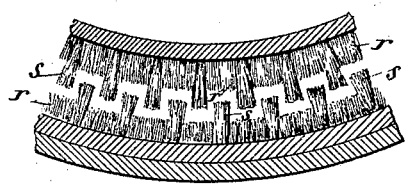

No. 647,314. Patented Apr. 10, 1900.
E. DE MOERLOOSE.
CHEMICALLY DECORTICATING GRAIN.
(Application filed Oct. 5, 1895.)

(No Model.)

Witnesses:
Geo. E. Cruse
Jas. W. White

Inventor:
Ernest de Moerloose,
By Knight Bros.
Attys.

UNITED STATES PATENT OFFICE.

ERNEST DE MOERLOOSE, OF BRUSSELS, BELGIUM.

CHEMICALLY DECORTICATING GRAIN.

SPECIFICATION forming part of Letters Patent No. 647,314, dated April 10, 1900.

Application filed October 5, 1895. Serial No. 564,778. (No specimens.)

*To all whom it may concern:*

Be it known that I, ERNEST DE MOERLOOSE, manufacturer, a subject of the King of Belgium, and a resident of Brussels, in the Kingdom of Belgium, have invented a new and Improved Method of Decorticating Grain, (for which patents have been obtained in Belgium, No. 89,258, dated July 12, 1895; in Germany, No. 92,533, dated August 21, 1895, and in Great Britain, No. 15,765, dated August 21, 1895,) of which the following is a specification.

My invention is an improvement on those decorticating methods in which the grain is wetted in acids.

The subject-matter of the present invention is a method of treating grain in general, and maize or corn in particular, by means of which the starch in the grain can be obtained without any loss in the natural form of the kernel, which is freed integrally from the epidermis and epicarpis and also from the germs. Thus the product is in a state of perfect purity and is consequently particularly adapted for use in breweries and starch and sugar factories.

My improved method consists in steeping the grain in an acid solution having the property of dissolving and extracting all mineral matters and at the same time condensing or consolidating the starchy kernel into a compact core which will not separate or disintegrate after having been a certain time in the bath which softens the outside covering of the kernel that forms the bran, loosening the germs, which are then eliminated from the mass by exposure to brushes in the presence of water, the water not having any dissolving action on the kernels of starch, which remain whole and are immediately available for transformation into glucose or maltose by the known methods without any other previous preparation.

The bath which is particularly adapted to the carrying out of the above method is composed of a solution of muriatic acid in water in the proportion of one-half to three per cent., the action of which on the grain is progressive in softening or lifting up at first the cellulose or bran, in loosening the germ, and in dissolving the nitrogenous matters disengaging in the bath, while the acid solution attacks the kernel of starch after the uplifting of the cellulose or bran and transforms the same partly into amylo-dextrine, which is a compact body and stands well against disintegration and permits it to be obtained whole without the slightest loss of starch during the following cleaning operations. The extracting action on the nitrogenous matters and the dissolving action on the cellulose or bran is considerably accelerated when the acid solution is carried to a temperature of from 30° to 50° centigrade, and it is still more effective when an oxidizing material has been added—such as bichromate and permanganate or ozonized or oxygenized water, &c.—which can be added in the proportion of from two to four grams per hectoliter of the acid solution and which acts especially upon the cellulose or bran, quickly mollifying or softening the same without any influence on the starch.

The duration of the immersion or steeping depends evidently on the nature of the grain, on the degree of acidulation of the solution, on the proportion of oxidizing matter, and finally on the degree of temperature under which the work is performed. The time of working can vary from six to forty-eight hours, and in order to make a proof to show that the action has been sufficient a few grains are crushed from time to time between the fingers to ascertain whether the epidermis gives way easily by tearing or by dividing itself and when the germ can be detached easily by sliding from out of its seat. Thus it can be determined when the operation of steeping might be considered finished. The bath can be then gathered up by simply letting it off, so as to serve for further operations after having been strengthened by an addition of acid and of oxidizing material.

When the acid solution has been withdrawn, the grain is submitted to the operation of cleaning or, in other words, to the operation of peeling the kernals, which is accomplished by allowing the grain to pass between suitable brushes, which take off the hulls (bran and germs) in the presence of water. The socket or alveolus in which the germ of the grains has been seated is very deep, and therefore I employ a special form or system of brushes having bristles in rows alternately projecting and retreating, the latter of which take off the epidermis, while the projecting rows, which are very flexible by reason of being rather long and narrow, are adapted to enter the sockets and dislodge the germ as neatly as though it had been cut out by means of a punch.

A suitable decorticating-machine is shown in the accompanying drawings, in which—

Figure 2:
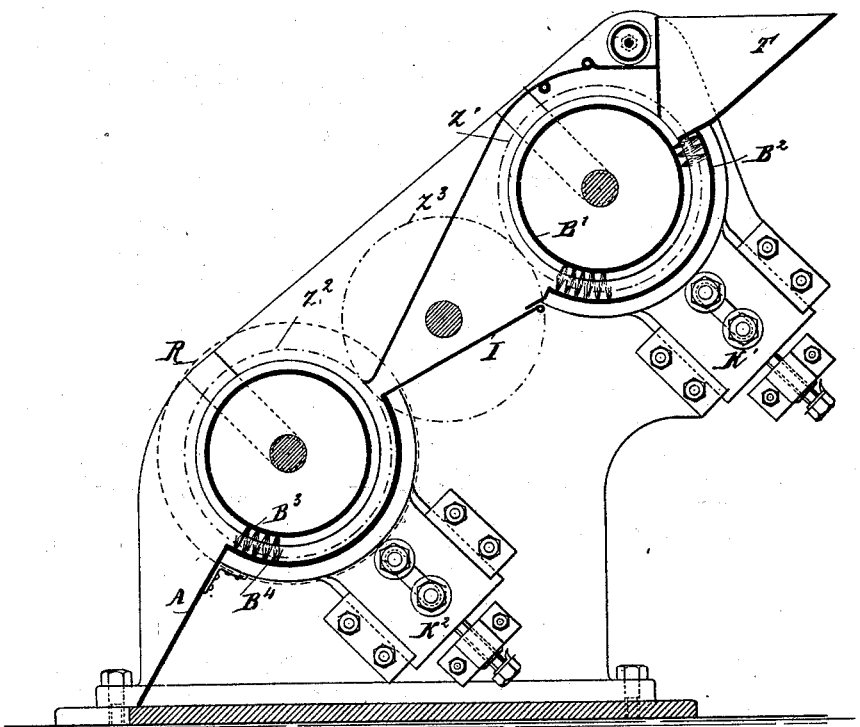

Figure 1 is a detail cross-section of two cooperating brushes, showing the disposition of the rows of bristles. Fig. 2 is a vertical cross-section of the machine on a reduced scale.

As has already been stated, the projecting rows $s$ of bristles are narrower than the other rows $r$, being set back, and both rows can have any desired direction. One of the brushes of each pair—that is, $B'$ and $B^3$—is cylindrical and is covered on its whole surface with rows of bristles, which alternately project and retreat, while the others—that is, $B^2$ and $B^4$—are half-cylindrical or concaves and are each covered in the same way with rows of bristles on the inner concave surface. The cylindrical brushes are concentric in the concavities, so that the rows of projecting bristles lightly touch each other and the cylindrical brushes receive a rotary motion, while the half-cylindrical or concave brushes are fixed. One of the pairs of brushes is situated lower than the other in order to facilitate the passage of the water and of the grain from one to the other. To this end also an intermediate bottom I is placed between the two brushes and at the exit of the lower pair or piece of sheet metal A is provided to guide the material, the whole being inclosed on the sides by lateral sheets, thus forming the great conduit, closed on top and provided with a feeding-hopper T. The lower cylindrical brush $B^3$ receives its rotary motion from a pulley R, keyed on its shaft, which carries also a pinion $Z^2$, being in gear with an intermediate pinion $Z^3$, which turns loosely on its pin and coöperates with the pinion $Z'$, keyed on the shaft of the upper brush $B'$, so that it turns in the same direction as the brush $B^3$. The half-cylindrical or concave brushes $B^2$ and $B^4$ are adjustable in suitable slides $K'$ and $K^2$, so that the space between the rows of bristles can be increased or decreased at will.

The operation of the machine is as follows:

The grain having been previously saturated in the chemical bath is conducted in a current of pure water or is introduced by it or with it into the hopper T, and through the latter it passes into or between the first pair of bushes $B'$ and $B^2$, whence it is thrown at the end of the half-cylindrical or concave brush upon the sheet metal, from where the water forces it along to the second pair of brushes $B^3$ and $B^4$, where it is exposed to the final treatment, to be evacuated by the sheet A completely free of germs and impurities, being thrown on a sieve or filter. During the passage of the grain between the brushes, which is effected in the presence of a continuous current of water, as hereinbefore mentioned, the grain loses by diffusion almost the whole of its albuminous substances and the whole of its mineral substances, which can be collected at will. When leaving the brushes, the mass is transported into a tub with washing-water, where the grains are separated from the hulls in the ordinary known manner, and the aforesaid diffusion is completed if the same did not have sufficient time to be finished during the brushing process, as may be the case when the brushing is carried on comparatively rapidly. The collected starch is then dried in any suitable manner and can be saccharified with extremely great facility by the malt and the acid, and the hulls obtained constitute an excellent fodder. Moreover, the germs furnish an excellent oil.

Having thus described my invention, the following is what I claim as new therein and desire to secure by Letters Patent:

A chemical process for the decortication of grain, which consists in soaking the grain in a dilute solution of hydrochloric acid containing a small quantity of an oxidizing agent at a temperature of from 30° to 50° centigrade, then brushing the soaked grain in the presence of water, whereby the bark and the germs are removed, and finally washing the grain; substantially as described.

ERNEST DE MOERLOOSE.

Witnesses:
AUG. JOERISSEN,
GREGORY PHELAN.